United States Patent [19]

Porter

[11] 4,184,694

[45] Jan. 22, 1980

[54] TRAILER FOR TRANSPORTING ELONGATED APPARATUS HAVING FLANGED MEMBERS ALONG EACH SIDE

[75] Inventor: John R. Porter, Waterloo, N.Y.

[73] Assignee: Porter-Way Harvester Mfg. Co. Inc., Waterloo, N.Y.

[21] Appl. No.: 897,669

[22] Filed: Apr. 19, 1978

[51] Int. Cl.$^2$ ............................................. B60P 7/08
[52] U.S. Cl. ........................................ 410/44; 280/400; 280/63; 248/507; 410/82; 410/2
[58] Field of Search ................... 280/63, 400, 179 R, 280/401, 482; 296/35 A, 3; 248/507, 508, 509

[56] References Cited

U.S. PATENT DOCUMENTS

| | | | |
|---|---|---|---|
| 2,038,156 | 4/1936 | Alexander | 280/401 |
| 3,245,695 | 4/1966 | Bernard | 280/400 |
| 3,701,562 | 10/1972 | Carr | 296/35 A |

FOREIGN PATENT DOCUMENTS

| | | | |
|---|---|---|---|
| 734310 | 5/1966 | Canada | 296/35 A |

*Primary Examiner*—John A. Pekar
*Attorney, Agent, or Firm*—Charles S. McGuire

[57] ABSTRACT

A trailer for attachment to a towing vehicle while supporting in locked engagement elongated apparatus such as a harvesting machine elevator having flanged members extending along each side thereof. Rigid frame means are supported on a pair of wheels at one end and provided with a tongue which may be telescopingly retracted to reduce the length of the trailer for loading into and transport upon another vehicle. A pair of support members, upon which the flanged portions of the transported apparatus rest, extend laterally across the front and rear of the frame means. Two pairs of locking members are provided, one member of each pair being disposed at each end of the two support members. The locking members are rotatable to position a fixed lug above the upper surface of the associated support member thereby firmly securing the flanged member of the transported apparatus between the support member and lug.

7 Claims, 3 Drawing Figures

U.S. Patent
Jan. 22, 1980
4,184,694
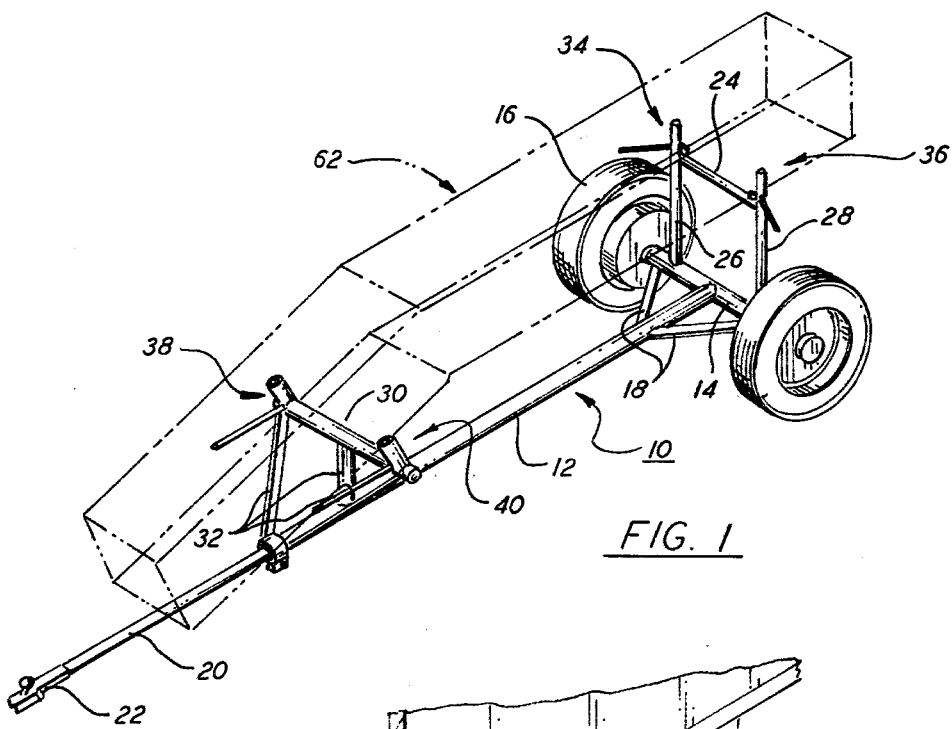
FIG. 1
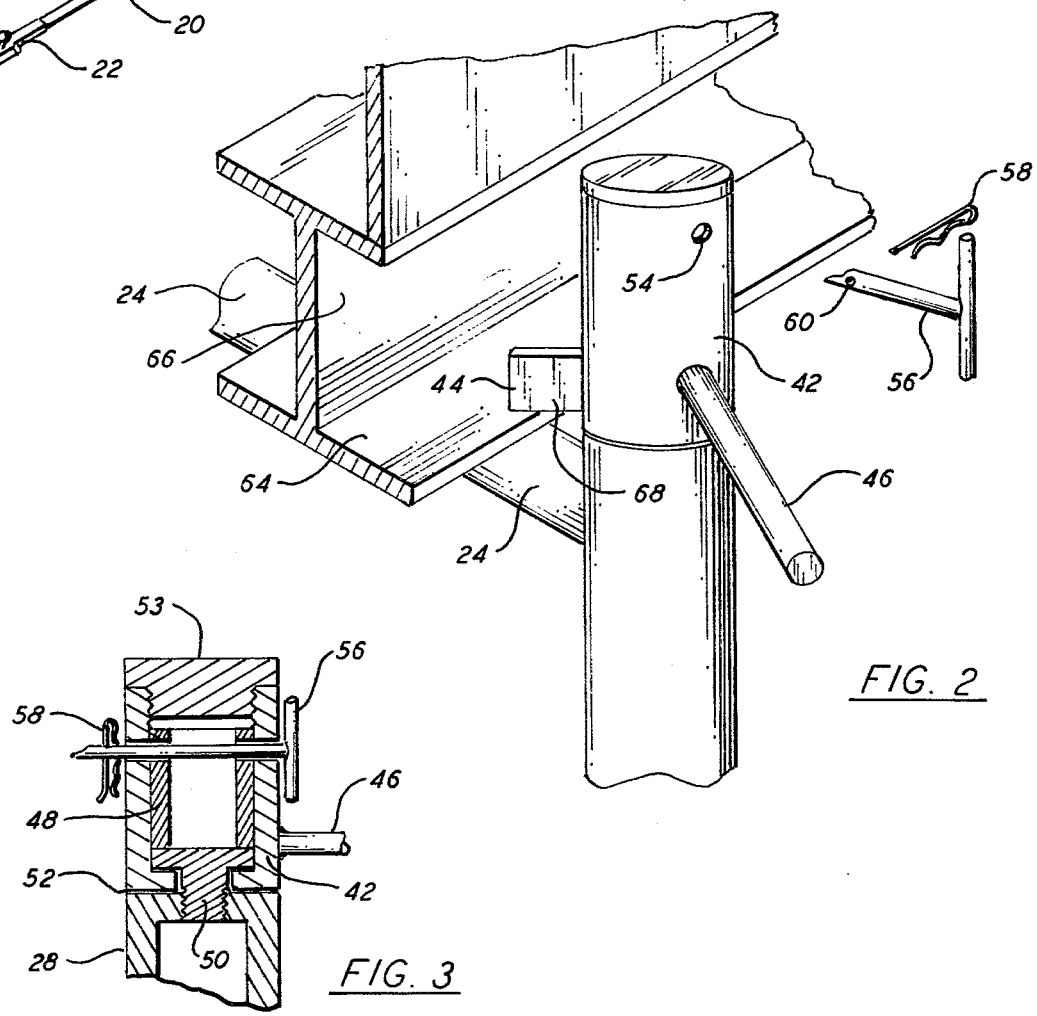
FIG. 2
FIG. 3

TRAILER FOR TRANSPORTING ELONGATED APPARATUS HAVING FLANGED MEMBERS ALONG EACH SIDE

BACKGROUND OF THE INVENTION

The present invention relates to trailers for transporting particular types of apparatus and, more particularly, to a towable trailer especially suited for transporting elongated, flanged members or other apparatus incorporating such members.

Large machines such as those used in the automated harvesting of various crops sometimes include laterally extending elements which renders movement along public roads dangerous and/or illegal. For example, present commercial embodiments of tomato harvesting machines such as disclosed in U.S. Pat. Nos. 3,810,512 and 3,999,613 of Wellington W. Porter include an elevator or discharge conveyor for the harvested fruit which extends laterally outward by a distance which would hamper or prevent movement of the machine over certain roads and other routes. Since it is often desirable to move the machine from one location to another via such routes, it is necessary to detach the elevator from the main body of the machine and transport it separately. The elevator itself is quite heavy and bulky, requiring considerable time and effort to detach, handle (e.g., load and unload from separate transporting means), and re-attach to the machine after movement to the new location.

It is a principal object of the present invention to provide a trailer which allows expeditious and convenient detaching, transporting and handling of the elevator conveyor of a harvesting machine of the type mentioned above.

A further object is to provide a novel and unique trailer for towing by another vehicle and particularly adapted to carry elongated apparatus having flanged members extending along each side.

Another object is to provide a trailer for transporting the elevator conveyor of a harvesting machine which requires only a single individual to load and unload the elevator as well as to detach and re-attach it from and to the harvesting machine.

A still further object is to provide a trailer having simple and easily manipulated, yet rugged and durable locking members for firmly holding the transported apparatus upon the trailer.

Other objects will in part be obvious and will in part appear hereinafter.

SUMMARY OF THE INVENTION

In accordance with the foregoing objects the invention contemplates a trailer having a wheel-supported frame means and rigidly attached support members which may be positioned directly beneath the discharge conveyor or elevator of the harvesting machine in order that the elevator may be lowered directly onto the trailer support members through operation of the hydraulic controls provided for movement of the elevator. The latter may then be detached from the main body of the machine simply by removing the pins by which the elevator is pivotally attached to the machine.

The beams or channel members which form the frame of the elevator rest upon the laterally extending support members of the trailer and provide the flange means by which the elevator is secured to the trailer. A locking member is provided at each end of the two lateral supports. Each locking member comprises a tubular member rotatably supported on the top of a similar, tubular post to which the lateral support member is attached, the axes of the posts and supports being at right angles. A fixed lug extends outwardly from the rotatable tubular member and a handle is provided for effecting manual rotation. In one position of rotation the lower surface of the lug is spaced from the upper surface of the lateral support by a distance substantially equal to the thickness of the flanged member. Thus, the apparatus to be transported may be placed upon the lateral support members with the flanged members extending longitudinally along the trailer, and each of the locking members rotated to engage the flange edges securely between the fixed lugs and lateral supports.

BRIEF DESCRIPTION OF THE DRAWING

FIG. 1 is a perspective view of the trailer of the invention with the apparatus transported thereby shown in phantom lines;

FIG. 2 is a fragmentary, enlarged, perspective view of a portion of the trailer and transported apparatus of FIG. 1; and FIG. 3 is a fragmentary, elevational view in half section of a portion of the structure shown in FIG. 2.

DETAILED DESCRIPTION

Referring now to the drawings, the preferred embodiment of the invention is shown in FIG. 1 and denoted generally by reference numeral 10. Trailer 10 is preferably formed entirely of rigid, tubular members and includes longitudinal frame member 12 and lateral frame member 14 which supports the axles of wheels 16. Frame members 12 and 14 are directly attached to one another (e.g., by welding) and further relatively supported by braces 18. Tongue 20 extends forwardly from frame member 12 and may preferably be slidingly telescoped with respect thereto. When apparatus is to be transported upon trailer 10, tongue 20 is extended and hitch means 22 is attached to a towing vehicle. When tongue 20 is fully retracted, the overall length of trailer 10 is not longer than the bed of a standard pick-up truck so that the entire trailer, when not being utilized to transport other apparatus, may be loaded onto and transported by a truck without being towed, as is sometimes desirable.

Rear lateral support member 24 is fixedly connected at its ends to vertical posts 26 and 28 which extend upwardly from lateral frame member 14. Front lateral support member 30 is fixedly supported by braces 32 with respect to frame member 12. A first pair of locking members, generally denoted in FIG. 1 by reference numerals 34 and 36, are provided at the top of posts 26 and 28, adjacent each end of rear lateral support 24. A second pair of locking members 38 and 40 are provided adjacent the ends of front lateral support 30.

All of the four locking members are of identical construction and function, details of one such member being shown in FIGS. 2 and 3. Hollow, cylindrical member 42 is rotatably supported upon the top of post 28. A boss or lug 44 and handle 46 extend radially from circumferentially spaced points on member 42. Although any convenient structure may be used for rotatably joining cylindrical member 42 to post 28, an example of such structure is shown in FIG. 3. Tubular member 48, having an external diameter slightly less than the internal diameter of cylindrical member 42 is placed within the latter with externally threaded portion 50 extending through an opening in the bottom of member 42. Portion 50 is threaded into an opening in the top of post 28 with gasket or washer 52 placed between opposing surfaces of member 42 and post 28. Thus, members 42 and 48 are rotatably and fixedly secured, respectively, with respect to post 28. Cap 53 is threaded or otherwise permanently secured on the top of member 42.

Opening 54 is provided in the wall of cylindrical member 42 and a second opening is provided diametrically opposite. These openings may be aligned with similar openings in tubular member 48 and locking pin 56 inserted through the openings, as shown in FIG. 3, to fix the rotational position of cylindrical member 42 with respect to post 28. Locking pin 56 is secured by insertion of cotter pin 58 through opening 60 therein.

Elongated apparatus of the type intended to be transported by trailer 10 is outlined in phantom lines in FIG. 1 and denoted generally by reference numberal 62. As previously mentioned, the apparatus primarily intended for transport by the trailer of the invention is the final discharge conveyor of a tomato harvesting machine such as that of U.S. Pat. Nos. 3,810,512 and 3,999,613. The conveyor frame includes a flanged member along each side, such as lower flange 64 of I-beam 66, a fragment of which is shown in FIG. 2. With trailer 10 positioned at the side of the harvesting machine, the discharge conveyor may be lowered about its pivotal connection to the machine by operation of the standard hydraulic controls on the machine to rest upon lateral supports 24 and 30 of the trailer. The pins connecting the conveyor to the machine may then be removed.

The width of apparatus 62, or at least that portion thereof resting upon the trailer supports, must of course be less than the distance between locking members 34 and 36 and between locking members when the latter are rotated to position the lugs above the lateral supports.

The lower edges or surfaces of the lugs are spaced by a predetermined distance from the upper surface of the corresponding lateral support when the locking members are rotated to position the lugs above the support members. This predetermined distance is substantially equal to the thickness of the flanged members resting upon the lateral supports. With reference to FIG. 2; the spacing between lower edge 68 of lug 44 and the upper surface of lateral support 24 is substantially equal to the thickness of flange portion 64 of apparatus 62.

All of locking members 34, 36, 38, and 40 are initially rotated to positions wherein neither the lugs nor handles are above the corresponding lateral support so that the longitudinally extending flange portions of the apparatus to be transported may be laid upon the lateral supports without interference. After the apparatus is placed on the trailer in the manner described, each of the four locking members are rotated to bring the fixed lugs above the lateral supports, thereby firmly engaging the flange portions between the lugs and supports. The locking pins are then inserted through the locking members to fix the rotational positions thereof and the cotter pins are inserted to prevent unintentional withdrawal of the locking pins. The apparatus may then be safely transported without danger of becoming detached from the trailer.

What is claimed is:

1. A trailer for transporting elongated apparatus having flanges of predetermined thickness extending outwardly along both lower, longitudinal sides, the lateral distance between the outer edges of the flanges likewise being a predetermined dimension, said trailer comprising:
   (a) rigid frame means including a tongue for attachment to a towing vehicle;
   (b) at least one pair of wheels supporting said frame and mounted thereon for rotation about a transverse axis;
   (c) first and second apparatus support members affixed to said frame means, extending laterally thereof with upper surfaces parallel to said transverse axis and spaced from one another longitudinally along said frame means;
   (d) first and second pairs of upstanding post members rigidly affixed to said first and second support members respectively, to extend along axes perpendicular thereof, the members of each pair being laterally spaced from one another by slightly more than said predetermined dimension;
   (e) a hollow, tubular member mounted upon each of said post members for selective rotation about the respective axes thereof;
   (f) a fixed lug extending outwardly from each of said tubular members, each of said fixed lugs having a lower surface movable in a plane parallel to said support member upper surfaces and spaced therefrom by substantially said predetermined thickness of said flanges;
   (g) the lugs on the tubular members on each of said pairs of post members being spaced along said plane by less than said predetermined dimension with said tubular members in a rotational position such that said lugs face toward one another; and
   (h) handle means extending fixedly from each of said tubular members for effecting manual rotation thereof.

2. The invention according to claim 1, wherein said handle means comprise a rod affixed to and extending radially from each of said tubular members.

3. The invention according to claim 1 and further including means for releasably fixing the rotational position of said tubular members relative to the internal support therefor in said predetermined position.

4. The invention according to claim 3 wherein said positional fixing means comprise openings in each of said locking members and the internal supports therefor which are in alignment when said locking members are in said predetermined position and a pin for removable insertion through said aligned openings.

5. The invention according to claim 1 wherein said tongue is telescopingly movable with respect to the remainder of said frame means between an extended position, for towing of the trailer by a vehicle, and a retracted position, for transport of the trailer upon a vehicle by reducing the overall length of said frame means.

6. The invention according to claim 1 wherein said frame means, said support members and said locking members are all constructed essentially entirely of tubular metal members.

7. The invention according to claim 1 and further including internal support means affixed to said post members and rotatably supporting said tubular members from within.

* * * * *